Sept. 5, 1933.                F. H. HARADON                1,925,187
                                 ANT JAR
                            Filed May 31, 1932
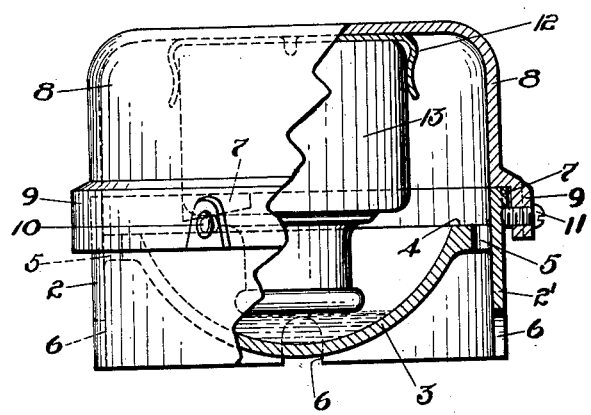
INVENTOR.
Fritz H. Haradon
BY
ATTORNEY Patented Sept. 5, 1933

1,925,187

UNITED STATES PATENT OFFICE 1,925,187

ANT JAR

Fritz H. Haradon, Pasadena, Calif.

Application May 31, 1932. Serial No. 614,559

7 Claims. (Cl. 43—121)

My invention relates to ant jars of the type used to contain poison and to be placed in suitable locations to attract and receive the ants as they search for the poison.

My invention has among its salient objects to provide a simple, practical and inexpensive device which can be easily moved from place to place and which has entrance doors or openings around its lower edge so that the ants can enter on the level of the surface upon which the device is placed, thus getting under shelter as soon as they pass through the openings without mounting any structure; to provide a device in two parts adapted to be secured together with the poison therein, the lower part having a bowl or receptacle for the poison, surrounded by an outside wall in the lower edge of which are the entrance openings so that the ants enter under the bowl or container for the poison; to provide around the top of said bowl a ledge with openings from the underside of said ledge, whereby the ants can climb up through said openings after they enter under the bowl and emerge upon said ledge around the upper part of the bowl containing the poison; to provide in such a device, a top part of dome-like formation adapted to receive and hold poison if said device should be overturned, said device resting upon its top with bottom up and the holes accessible from the top while in the overturned position; to provide an ant jar having a top portion provided with means for receiving a bottle or original container of ant poison and for holding it in inverted position for automatic feed down into the lower part of the device, thus making it possible to quickly place a small bottle of poison in the device, secure the parts of the device together and set it for the reception of the ants or other insects for which it may be adapted; and, in general, to provide an ant jar or the like which is safe and certain as a container of poison which is to be placed where it might be accessible to other animals and even to children.

In order to explain my invention, I have illustrated the same on the accompanying sheet of drawing, in which Figure 1 is a side view of an ant jar embodying my invention, partly in the elevation and partly in section.

Referring now in detail to the drawing, the lower part of my device is designated 2 and consists of a bowl 3, having a ledge 4 around its top, with holes 5 through said ledge from the underside and outside of said bowl, there being several of said holes around said ledge 4. Said bowl 3 is surrounded by an outer wall 2', having entrance openings 6 around its lower edge and through which ants or other insects can enter from the level upon which said device is placed. Formed on the outer side of said wall 2, near the top edge thereof, are wedge-shaped or tapering lug portions 7, at different locations around the top of said wall, to serve as fastening means for the top or cover portion of said device and hereinafter again referred to.

The top or cover of said device is designated 8, and is of dome form with an enlarged lower edge, offset as at 9, to fit down over the wall 2 of the lower part and over said wedge-shaped portions 7, as will be clear from the drawing. A set screw 11 is shown and there are two other set screws, as at 10, secured in said lower edge 9 and projecting inwardly to move under the tapered portions 7, as said top is put into place and turned in a well known manner, thus securing said top or cover in place upon the lower part. The set screw can be tightened to secure said top permanently as long as the set screw is tight. Thus the two parts are quickly and easily put together in the manner clearly indicated in the drawing.

In the top of the cover 8 I have shown a retaining spring member 12, adapted to receive and hold a small bottle 13 which contains the poison. This can be an original container in which the poison is sold, or a special container, as desired, and it can be secured in place in an inverted position within the dome or top part of the device as may be desired. It will be noticed that the mouth of this inverted container extends into the bowl 3 of the lower part of the device so as to function as an automatic feed, the level of the poison being indicated in the bowl 3 by the horizontal lines.

It will also be noted that should the device be overturned, the top part will receive the poison and hold it from leaking out while the device is upside down. This would make it possible for ants to climb up the outside of the walls of the members 8 and 2 and down inside of the wall 2 and through the holes 5 to the inside of the top where the poison is confined. The device is not put out of use by being overturned.

It will thus be seen that I have provided a very simple, practical and effective ant jar which can be placed upon a surface and with provision for the ants moving into the device on the level of its support, whereupon they are under the device and sheltered and can climb up the inside of the wall and through the holes 5 and to the ledge 4, from which they can move around said ledge and down to the level of the poison and then out again.

I do not, however, limit my invention to the details of construction and arrangement shown and described for illustrative purposes, except as I may be limited by the hereto appended claims.

I claim:

1. An ant jar consisting of two parts detachably secured together, the lower part forming a bowl to receive poison and the upper part forming a cover therefor, a surrounding wall outside of said bowl with entrance openings in its lower edge, whereby ants can enter under said bowl within said surrounding wall, openings being provided between said surrounding portion and said bowl, whereby ants can climb up into the bowl to the poison.

2. An ant jar consisting of two parts detachably secured together, one above the other, the lower part being in the form of a bowl to receive poison and the upper part forming an inverted cup-like portion over said bowl, an outside wall surrounding said bowl with openings therethrough to the inside thereof, and with other openings provided leading to the top edge of said bowl, whereby ants can have access to said bowl and the poison therein.

3. An ant jar including a bowl portion having a ledge surrounding its edge with openings therethrough, an outer wall surrounding said bowl with means for ingress to the inside thereof and a cover portion over said bowl and said openings through said ledge, whereby ants can climb up through said openings from below and over into said bowl.

4. An ant jar including a bowl portion having a ledge surrounding its edge with openings therethrough, an outer wall surrounding said bowl with means for ingress to the inside thereof, a cover portion for said bowl and said openings through said ledge, whereby ants can climb up through said openings from below and over into said bowl, and means in said cover portion for suspending in inverted position a container for poison with its mouth down in said bowl.

5. An ant jar body having a bowl portion therein, inlet openings thereto for entrance of ants to said bowl, a bottle-like container for poison, a cover portion over said bowl and having means for holding said container in inverted position with its discharge mouth within said bowl, said cover portion being adapted to receive poison therein around said container when said jar body is overturned.

6. An ant jar body having an outside surrounding wall of cylindrical form with a bowl portion within said wall, inlet openings leading from the outside to said bowl, a cover for said body with means for securing it in place thereon, said cover having means held therein to hold poison which means has a discharge mouth extended down into said bowl for feed as said poison level lowers in said bowl.

7. An ant jar body having an outside wall with a bowl therein, inlet openings from the outside to the top of said bowl, whereby ants can move on said wall to said openings to said bowl, a cover over said bowl with means for securing it in place thereover, and a poison container suspended in said cover and having its discharge mouth extended down into said bowl when said parts are placed together, said cover being adapted to receive the poison when said body is overturned.

FRITZ H. HARADON.